May 22, 1945.  M. LE R. STONER  2,376,731
CONTROL MECHANISM FOR AIRPLANES
Filed May 19, 1943  5 Sheets-Sheet 1
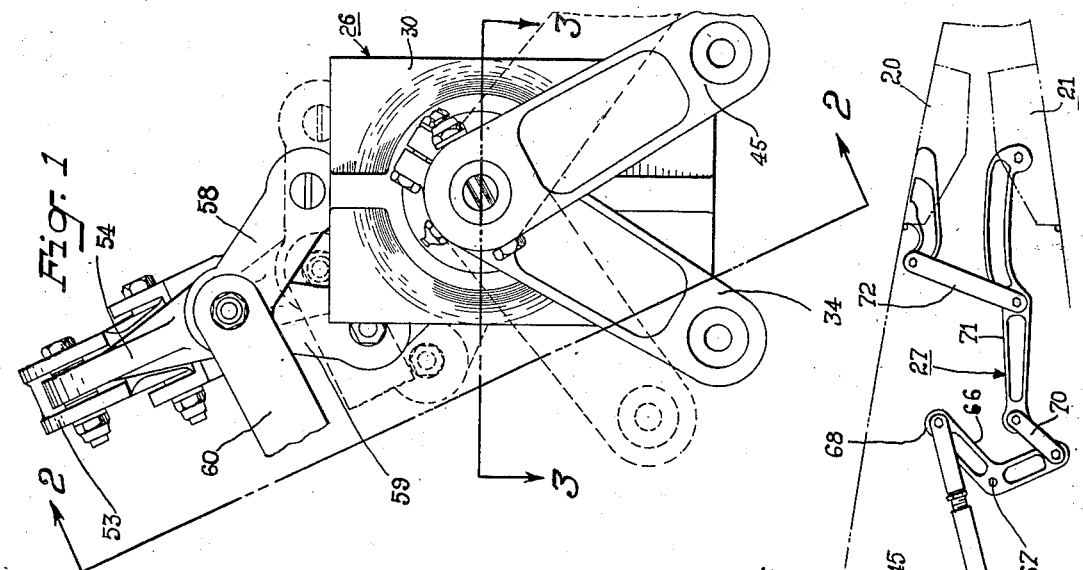
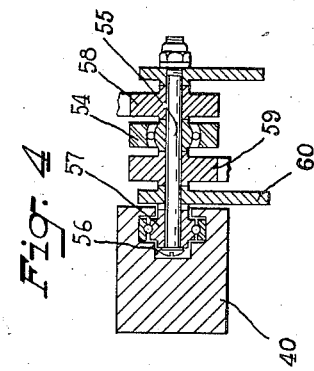
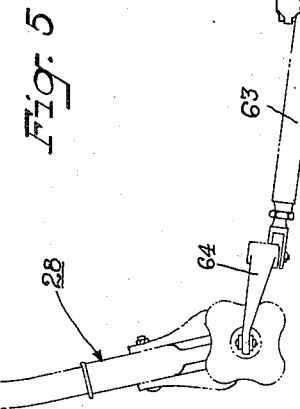
INVENTOR
MARVIN LeROY STONER
BY
ATTORNEY May 22, 1945.  M. LE R. STONER  2,376,731
CONTROL MECHANISM FOR AIRPLANES
Filed May 19, 1943  5 Sheets-Sheet 3
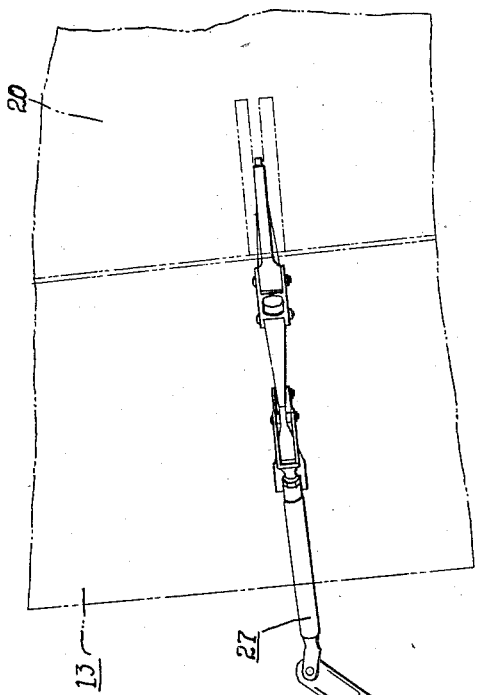
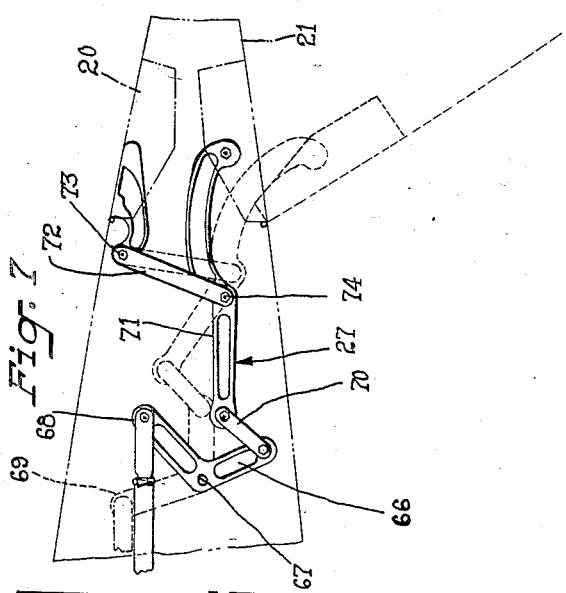
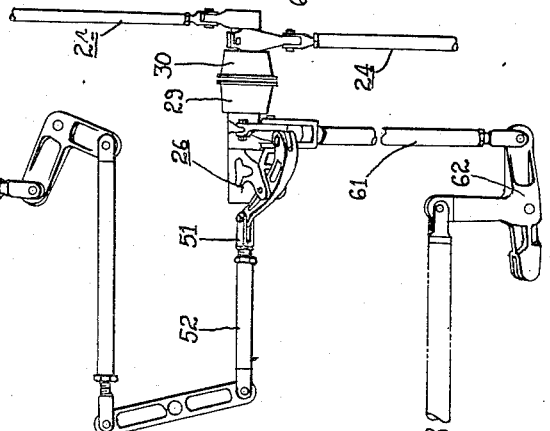
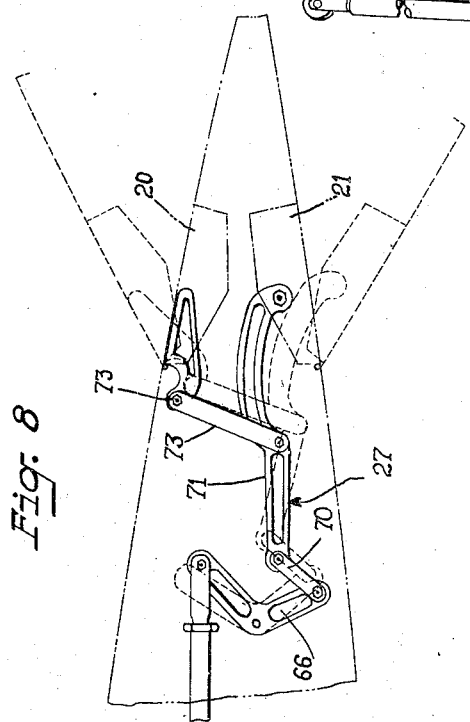
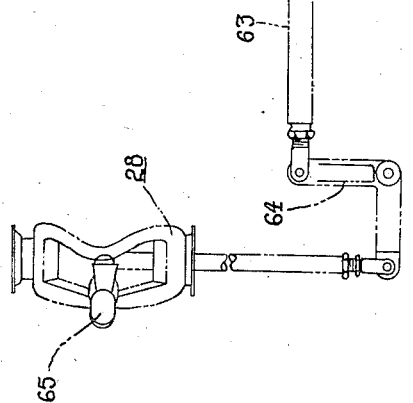
INVENTOR
MARVIN LeROY STONER
BY
ATTORNEY

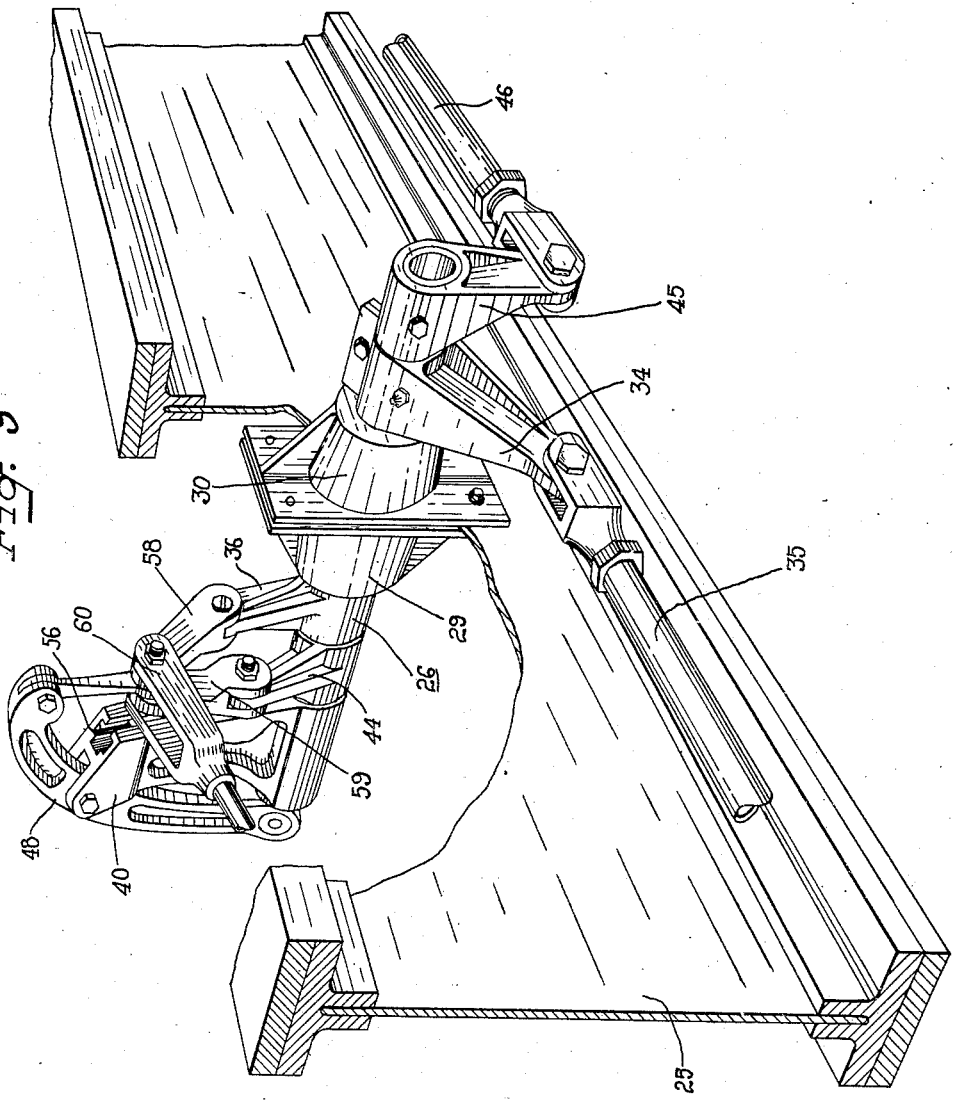

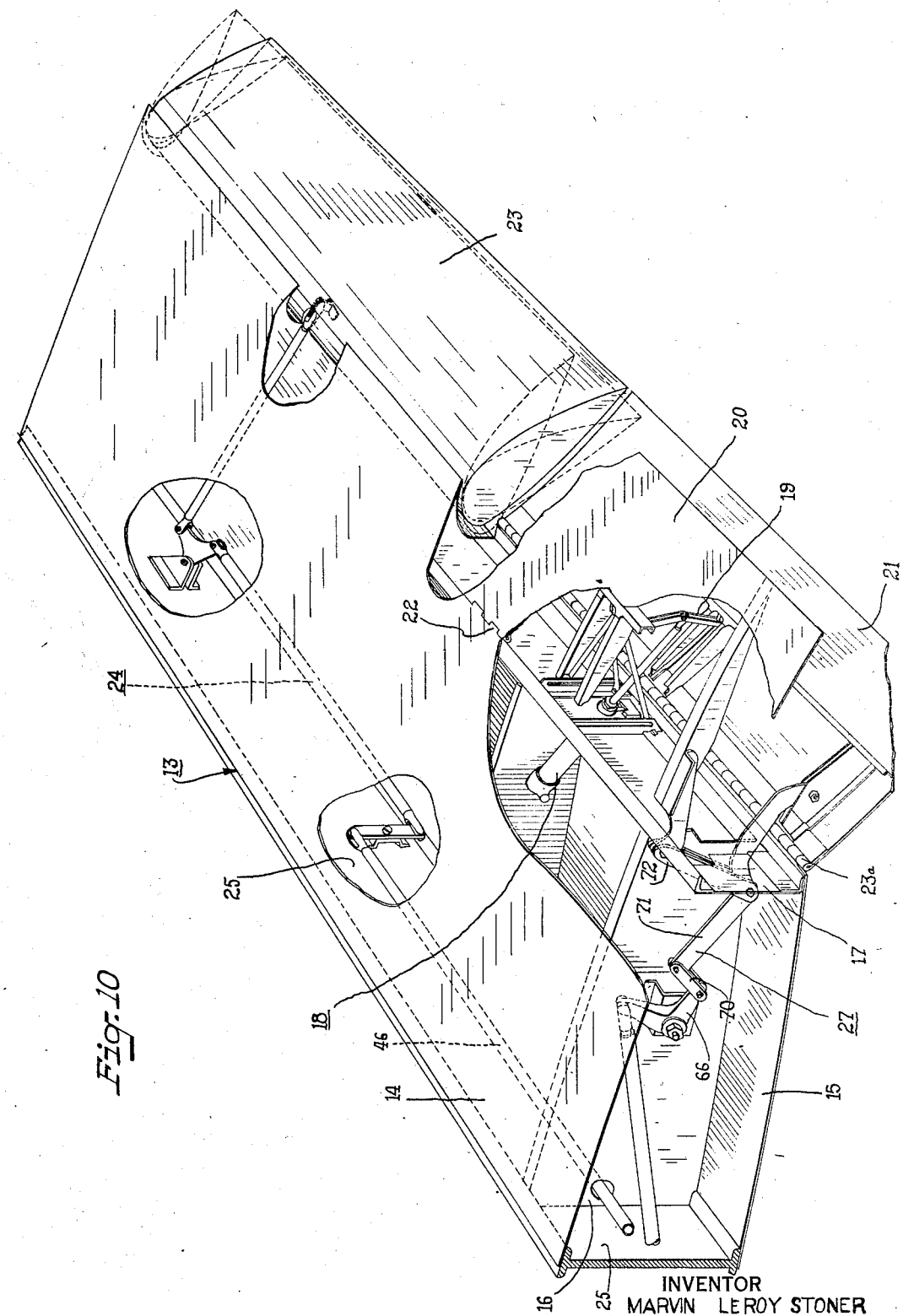

Patented May 22, 1945

2,376,731

UNITED STATES PATENT OFFICE 2,376,731

CONTROL MECHANISM FOR AIRPLANES

Marvin Le Roy Stoner, Elizabeth, N. J., assignor to Curtiss-Wright Corporation, a corporation of Delaware Application May 19, 1943, Serial No. 487,830

3 Claims. (Cl. 244—83)

This invention relates to airplanes and more particularly to mechanisms for the control of the control surfaces thereof.

The principal object of the present invention is to provide a means for giving added lift to the airplane at times of landing and take off, which is in addition to the usual flap arrangements.

It is another object of the invention to provide means for drooping the ailerons of the airplane without loss of control of the same, at times of landing and take off, to give to the airplane added lift.

It is still another object of the invention to provide an automatic means selectively responsive only to the movement of lower flap for drooping the ailerons and automatically ineffective when the flaps are split.

According to the present invention, there is provided in the usual airplane structure, a pair of split flaps adapted to be operated by any of the well-known methods of operating split flap mechanisms. Adjacent the flaps is the usual aileron adapted to be controlled by a manually operable mechanism which includes a pair of divided connecting links adapted to be respectively connected with the ailerons at the opposite sides of the airplane and a toggle link arrangement connected between these connecting links to separate the same and to thereby effect drooping of the ailerons. These toggle links are connected with the flaps in such a manner that as the lower flap is lowered by the usual flap operating mechanism, movement will be automatically imparted to the toggle links and thence to the connecting links to droop the ailerons. The adjustable or toggle link arrangement is rotatively mounted on a transversely extending spar so as to be rotated as a unit and in such a manner that drooping of the ailerons may be had without loss of control of the same by the manually operable control mechanism.

For other objects and for a better understanding of the invention, reference may be had to the following detailed description taken in connection with the accompanying drawings, in which Fig. 1 is an end elevational view of the adjustable or toggle link arrangement illustrating in dotted lines the positions of the elements thereof when the arrangement has been operated to effect the drooping of the ailerons.

Fig. 4 is another cross sectional view of the toggle link arrangement taken in another plane along the line 4—4 of Fig. 2, and looking in the direction of the arrows thereof.

Fig. 5 is a more or less diagrammatic view of the aileron control mechanism and the connection thereof with the flaps.

Fig. 6 is another view of the mechanism shown in Fig. 5, but more or less in plan showing the various operating mechanisms and linkages.

Fig. 7 is a view, in elevation, through the flaps and of the portion of the linkage immediately adjacent thereto and showing in dotted lines the position of the linkage when the lower flap is in its full lowered position.

Fig. 8 is a view similar to Fig. 7 of the linkage and illustrating the position of the various links thereof when the flaps are moved to their split flap positions.

Fig. 9 is an enlarged perspective view of the spar and the toggle link arrangement, illustrating particularly well the connections of the arrangement with the divided connecting links running coextensively with the spar.

Fig. 10 is a perspective view of an airplane wing structure having split flaps and an aileron thereon and showing parts of the mechanisms utilized for the operation of the flaps and ailerons.

Figure 2:
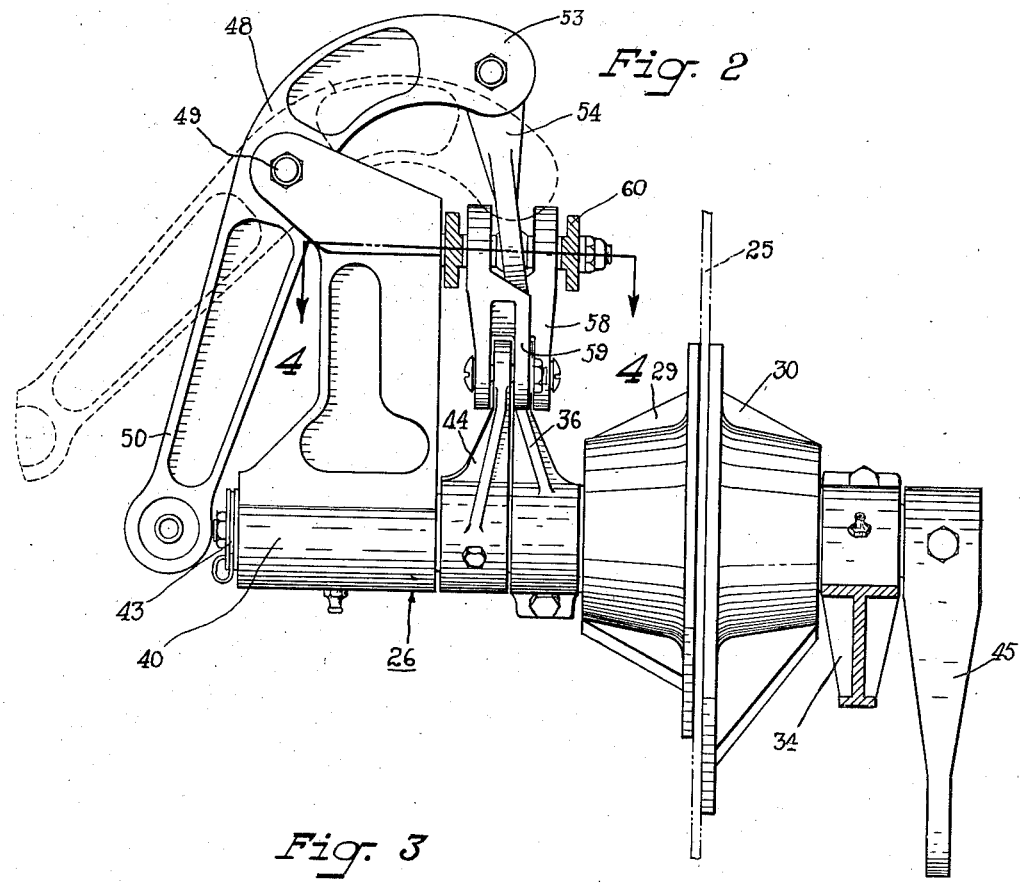
Fig. 2 is a side elevational view of the adjustable or toggle link arrangement and illustrative of the manner in which it is mounted on the spar and as taken along the line 2—2 of Fig. 1, and looking in the direction of the arrows thereof.
Figure 3:
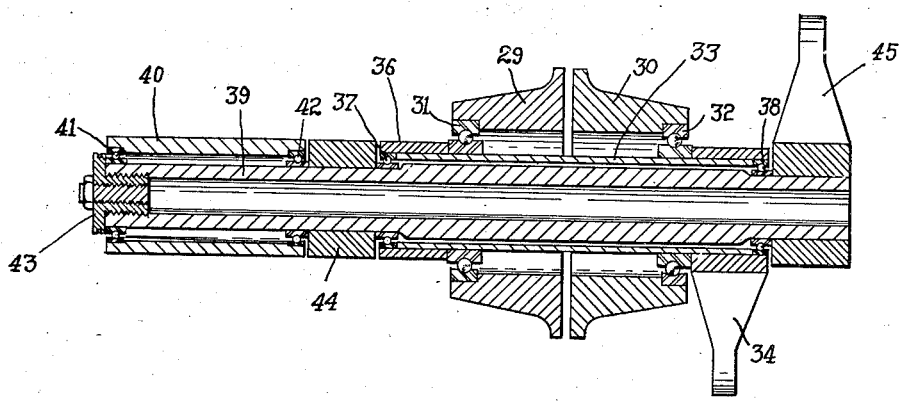
Fig. 3 is a cross sectional view of the toggle link arrangement showing the concentric shafting, as taken along the line 3—3 of Fig. 1, and looking in the direction of the arrows thereof.

Referring now particularly to Fig. 10, there is shown an aircraft wing structure 13 having its usual upper and lower skin blankets 14 and 15 connected to ribs 16 and laterally extending rear spar 17. This rear spar 17 carries a hydraulic flap-operating mechanism 18 including a pair of toggle links 19 respectively connected to upper and lower flaps 20 and 21 hinged as indicated at 22 and 23a to the respective upper and lower skin blankets 13 and 15.

The hydraulic flap-operating mechanism 18 is similar to that disclosed and described in the patent application of R. C. Blaylock and Peter Bukoff, Serial No. 480,116, filed March 22, 1943, and includes mechanism for selectively operating the flaps 20 and 21 together to split open position or to operate the lower flap 21 singly to its fully lowered position. Also connected to the wing structure adjacent the outer end of the flaps 20, is the usual aileron 23 adapted to be operated by a linkage mechanism 24 having parts connected to a forward spar 25 and extending coextensively with respect thereto. The spar 25 may run through the aircraft fuselage and is so arranged as to carry an adjustable or toggle link arrangement 26, such as shown in Figs. 1, 2, and 9. Associated with the flaps 20 and 21 is a linkage mechanism 27 adapted to be connected with the toggle link arrangement 26 for effecting operation of the same to droop the aileron 23.

Referring now more particularly to Figs. 5 and 6, there is shown, in its entirety, the linkage mechanism 27 which serves for operating the toggle link arrangement 26 which is connected respectively to divided linkages 24 which are respectively adapted for connection with the ailerons 23. The toggle link arrangement 26 is pivotally mounted on the spar 25 and can be rotated as a unit by a manually operable aileron control mechanism 28. This manually operable mechanism 28 is thus, through the toggle link arrangement 26, always in connection with the linkages 24 to effect operation of the ailerons.

Referring now more particularly to Figs. 1, 2, 3, and 9, there is shown the manner in which toggle link arrangement is mounted on the spar 25. To effect this mounting of the same as a unit, there is provided an opening through the web of the spar and to the web is connected a pair of journal bearing brackets 29 and 30, Fig. 3. These brackets respectively carry ball races 31 and 32 in which is disposed a sleeve 33 having an arm 34 thereon adapted for connection with a link 35 of one of the linkages 24. On the opposite end of the sleeve 33 is an upwardly extending arm 36. Within this sleeve 33, there is provided other ball races 37 and 38 in which is disposed a central shaft 39 which extends considerably forwardly beyond the end of the sleeve 33 to serve as a support for a supporting member 40. The supporting member 40 is connected to the shaft 39 by ball races 41 and 42 to permit relative movement between the supporting member 40 and the shaft 39. The ball race 41 and the supporting member 40 are retained on the shaft 39 against axial displacement by a threaded cap 43. Adjacent the respective ends of the sleeve 33 and connected to the shaft 39 to be operated thereby, are lever arms 44 and 45, the latter of which connecting with a connecting link 46 of a linkage 24 of the other aileron. It should now be apparent that the shaft 39 and the sleeve 33 have relative movement with respect to each other and that the lever arms on one will move in opposition to the lever arms on the other.

On supporting member 40, there is pivoted an adjusting lever 48 as indicated at 49 on the upper end of the supporting member 40. This lever 48 is pivoted about an axis transverse to the axis of rotation of the toggle arrangement and an arm 50 extends downwardly into alignment with the axis of rotation. This arm 50 is connected as shown more clearly in Fig. 6, to a swivel element 51 on a link 52 forming a part of the linkage 27 connected with the flaps. It will be thus apparent that as the toggle link arrangement is rotated about its axis that this movement can be readily imparted without affecting the linkage 27, since the swivel 51 is rotated about an axis of the link 52 which is substantially in alignment with the axis of rotation of the toggle link arrangement. The lever 48 has an upper arm 53 to which is connected a depending link 54 which is connected to a cross head 55 slidable in a vertically extending groove 56 in the supporting member 40. This cross head 55 has a ball race 57 that fits within the groove 56.

Connected respectively to the levers 36 and 44, are toggle links 58 and 59 which are respectively connected at their opposite ends to the cross head 55. As the cross head is slid vertically, the toggle links 58 and 59 will be either spread or closed depending upon the direction of movement of the cross head in the slide. If the movement is downward, the toggle links will be spread and upon continued movement downwardly they may be locked over center to effect thereby a lateral spreading and locking of the arms 34 and 45 which are connected with the connecting links of the aileron operating linkages 24. As this is done, the connection between the ailerons is elongated and the effect is to droop the ailerons about their hinge joints so as they will provide or serve as a lift device upon the landing and take-off of the airplane.

Also connected to the cross head 55 is a clevis 60 forming a part of the aileron control linkage 28. This clevis is fixed to a link 61 which is connected to a bell crank 62. The bell crank 62 is connected by a link 63 to another bell crank 64 which is operated by a manually operable stick 65 usually located in the airplane cockpit and accessible to the pilot. As this linkage 28 is manipulated as the operator depresses stick 65 in one direction or another, the clevis 60 will act upon the cross head and the supporting member 40 to effect rotation of the shaft 39 and sleeve 33 in the bearing journal brackets 29 and 30. Such movement will operate the ailerons to laterally control the airplane. This operation is possible at all positions of the toggle links and adjustments of the separable connecting links. While the ailerons are in their drooped position, they may continue to be controlled by the aileron control linkage 28.

Referring now particularly to Figs. 7 and 8, there will now be described the operation of the linkage which selectively controls the operation of the toggle link arrangement 26. In the view shown in Fig. 7, the lower flap as shown by dotted lines, has been moved to its full down position while the upper flap has remained closed. This causes a bell crank 66 to be rotated about its pivot connection 67 with the wing structure 13. It will be noted that upon movement of the flap to its full lowered position, that the upper arm 68 of bell crank 66 has moved a considerable distance forwardly to the position shown in dotted lines at 69, Fig. 7. This movement is quite considerable and is sufficient to effect pivotal movement of the lever 48 on the supporting member 40 to a position as shown in dotted lines in Fig. 2. This movement depresses the link 54 and the toggle links 58 and 59 to adjust and retain the ailerons to their dropped position. Referring again to Fig. 7, it will be noted that the large movement of the bell crank 66 is accompanied by the arrangement and connection of links 70, 71, and 72 with the flaps. When the upper flap is retained in its closed position the link 72 will pivot about a fixed point 73. As the lower flap moves downwardly the lever 71 is pivoted about a pivot connection 74 of the lever 71 with the link 72. This causes the link 70 to be raised upwardly and since the link 70 is connected to the bell crank 66, it will be pivoted about its pivot point 67.

Referring now more particularly to Fig. 8, there is shown the condition in dotted lines of the links as both flaps are put into the part-way opened or split position. Since the upper flap is moved, the point 73 will also move, making the same into a movable pivot. This will allow the link 72 to move bodily rearwardly and down to straighten the connection of the link 71 with the link 70 without imparting any greater movement to the bell crank 66. It will be noted in Fig. 8 that the amount of movement effected by the bell crank 66 is considerably less than the amount of movement by the bell crank when the lower flap is operated singly and is hardly enough to take up slack in the linkage. It should thus be apparent that the mechanism 27 is by virtue of its construction and arrangement, selective to operate the toggle link arrangement only when the lower flap is moved to its fully lowered position and is practically inoperable when both flaps are opened to their split flap position.

It should now be apparent that there has now been provided a mechanism whereby the ailerons can be drooped out to provide out of the ailerons a lift increasing device for airplanes and also an arrangement of this mechanism whereby the ailerons are drooped automatically when the lower flap is moved to its full lowered position and that this drooping of the ailerons is done without loss of control of the ailerons themselves.

While various changes may be made in the detail construction, it shall be understood that such changes shall be within the spirit and scope of the present invention as defined by the appended claims.

I claim as my invention:

1. In an aileron and flap control mechanism for airplanes having pilot controlled aileron actuating mechanism for moving the right and left ailerons in opposite directions and flap actuating mechanism for moving the right and left flaps in the same direction, a rotatable shaft extending substantially normal to the transverse axis of the airplane, a laterally extending linkage assembly containing four links, the two outer links being operatively connected to said right and left ailerons, respectively, the two inner links being mounted for rotation on said shaft and acting as cranks, means operatively connected to said aileron actuating mechanism for rotating said cranks in unison to laterally translate said outer links in unison whereby to move said ailerons in opposite directions, and means operated by lowering and raising of said flaps for rotating said cranks relative to each other to laterally translate said outer links relative to each other whereby to move said ailerons in the same direction.

2. In an aileron and flap control mechanism for airplanes having pilot controlled aileron actuating mechanism for moving the right and left ailerons in opposite directions and flap actuating mechanism for moving the right and left flaps in the same direction, a rotatable shaft extending substantially parallel to the longitudinal axis of the airplane, a laterally extending linkage assembly containing four links, the two outer links being operatively connected to said right and left ailerons, respectively, the two inner links being mounted for rotation on said shaft and acting as cranks, means operatively connected to said aileron actuating mechanism for rotating said cranks in unison to laterally translate said outer links in unison whereby to move said ailerons in opposite directions, and means operated by lowering and raising of said flaps for rotating said cranks relative to each other to laterally translate said outer links relative to each other whereby to move said ailerons in the same direction.

3. In an aileron and flap control mechanism for airplanes having pilot controlled aileron actuating mechanism for moving the right and left ailerons in opposite directions and flap actuating mechanism for moving the right and left flaps in the same direction, a rotatable shaft extending substantially parallel to the longitudinal axis of the airplane, a laterally extending linkage assembly containing four links, the two outer links being operatively connected to said right and left ailerons, respectively, the two inner links being mounted for rotation on said shaft and acting as cranks, a toggle having its ends thereof pivotally connected to arms of said cranks, means connecting said aileron actuating mechanism to the knee joint of said toggle and acting in a substantially tangential direction to rotate said cranks in unison and thereby laterally translate said outer links in unison whereby to move said ailerons in opposite directions, and means operated by lowering and raising of flaps and connecting said flaps to the knee joint of said toggle and acting in a substantially radial direction to rotate said cranks relative to each other, and thereby laterally translate said outer links relative to each other whereby to move said ailerons in the same direction.

MARVIN LE ROY STONER.